(12) United States Patent
Salter et al.

(10) Patent No.: US 9,495,040 B2
(45) Date of Patent: Nov. 15, 2016

(54) SELECTIVELY VISIBLE USER INTERFACE

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 278 days.

(21) Appl. No.: 14/452,908

(22) Filed: Aug. 6, 2014

(65) Prior Publication Data
US 2015/0199041 A1 Jul. 16, 2015

Related U.S. Application Data

(63) Continuation-in-part of application No. 14/301,635, filed on Jun. 11, 2014, which is a continuation-in-part
(Continued)

(51) Int. Cl.
*G06F 3/042* (2006.01)
*G06F 3/0481* (2013.01)
*G06F 3/0488* (2013.01)
*B60Q 3/00* (2006.01)
*B60Q 3/02* (2006.01)
*B60K 37/06* (2006.01)
*B60Q 3/04* (2006.01)

(52) U.S. Cl.
CPC ............... *G06F 3/042* (2013.01); *B60K 37/06* (2013.01); *B60Q 3/004* (2013.01); *B60Q 3/008* (2013.01); *B60Q 3/0279* (2013.01); *B60Q 3/0293* (2013.01); *B60Q 3/0296* (2013.01); *B60Q 3/044* (2013.01); *G06F 3/0481* (2013.01); *G06F 3/0488* (2013.01)

(58) Field of Classification Search
CPC ................ B60Q 3/0279; B60Q 3/0296; B60Q 3/044; B60Q 3/004; B60Q 3/008; B60Q 3/0293; B60K 37/06; G06F 3/042
See application file for complete search history.

(56) References Cited

U.S. PATENT DOCUMENTS 5,239,152 A  8/1993 Caldwell et al.
5,709,453 A  1/1998 Krent et al.
(Continued)

FOREIGN PATENT DOCUMENTS

CN  201169230 Y  12/2008
CN  101337492 A  1/2009
(Continued)

*Primary Examiner* — David V Bruce
(74) *Attorney, Agent, or Firm* — Vichit Chea; Price Heneveld LLP

(57) ABSTRACT

A user interface for a vehicle is disclosed. The user interface comprises a vehicle panel having a proximity sensor, a first photoluminescent portion and a second photoluminescent portion. The user interface further includes a first light source configured to selectively activate the first photoluminescent portion and a second light source configured to selectively activate the second photoluminescent portion. The second photoluminescent portion is configured to reveal a symbol in a backlit configuration in response to the activation of the second light source.

20 Claims, 6 Drawing Sheets

Related U.S. Application Data of application No. 14/156,869, filed on Jan. 16, 2014, which is a continuation-in-part of application No. 14/086,442, filed on Nov. 21, 2013.

(56) References Cited

U.S. PATENT DOCUMENTS

| | | | |
|---|---|---|---|
| 6,117,362 A | 9/2000 | Yen et al. | |
| 6,577,073 B2 | 6/2003 | Shimizu et al. | |
| 6,664,489 B2 | 12/2003 | Kleinhans et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,454,181 B2 | 6/2013 | Salter et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,846,184 B2 | 9/2014 | Agrawal et al. | |
| 8,952,341 B2 | 2/2015 | Kingsley et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2009/0262515 A1 | 10/2009 | Lee et al. | |
| 2010/0097346 A1 | 4/2010 | Sleeman | |
| 2010/0232171 A1 | 9/2010 | Cannon et al. | |
| 2011/0012062 A1 | 1/2011 | Agrawal et al. | |
| 2011/0273375 A1 | 11/2011 | Wilford | |
| 2012/0001406 A1 | 1/2012 | Paxton et al. | |
| 2012/0104954 A1 | 5/2012 | Huang | |
| 2012/0105369 A1 | 5/2012 | Nakamura | |
| 2012/0183677 A1 | 7/2012 | Agrawal et al. | |
| 2012/0257416 A1* | 10/2012 | Demma | G02B 6/0041 362/613 |
| 2012/0280528 A1 | 11/2012 | Dellock et al. | |
| 2013/0155723 A1 | 6/2013 | Coleman | |
| 2013/0271204 A1 | 10/2013 | Salter et al. | |
| 2013/0335994 A1 | 12/2013 | Mulder et al. | |
| 2014/0065442 A1 | 3/2014 | Kingsley et al. | |
| 2014/0103258 A1 | 4/2014 | Agrawal et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2013033735 A1 | 3/2013 |
| WO | 2014068440 A1 | 5/2014 |

* cited by examiner

SELECTIVELY VISIBLE USER INTERFACE

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to a user interface for a vehicle and more particularly relates to a user interface that is selectively visible.

BACKGROUND OF THE INVENTION

Illumination arising from photoluminescent structures offers a unique and attractive viewing experience. It is therefore desired to incorporate such photoluminescent structures in vehicle lighting systems to provide ambient and task lighting.

SUMMARY OF THE INVENTION

According to one aspect of the present invention, a user interface for a vehicle is disclosed. The user interface comprises a first light guide, a second light guide, and at least one proximity sensor. The first light guide is disposed proximate an exterior surface and the second light guide is disposed proximate the first light guide. The proximity sensor is disposed proximate the first light guide and the second light guide. At least one symbol is disposed between the first light guide and the second light guide, wherein, a symbol is selectively illuminated in a backlit configuration.

According to another aspect of the present invention, a selectively visible user interface is disclosed. The user interface comprises a controller in communication with at least one light source and a proximity sensor. The user interface is disposed in a vehicle panel configured to conceal the proximity sensor. The controller is configured to identify a first signal from the proximity sensor corresponding to a detection of an object at a first proximity. In response to the detection, the controller is configured to activate the light source to reveal a symbol demonstrating a user input to the proximity sensor.

According to yet another aspect of the present invention, a user interface for a vehicle is disclosed. The user interface comprises a vehicle panel having a proximity sensor, a first photoluminescent portion and a second photoluminescent portion. The user interface further includes a first light source configured to selectively activate the first photoluminescent portion and a second light source configured to selectively activate the second photoluminescent portion. The second photoluminescent portion is configured to reveal a symbol in a backlit configuration in response to the activation of the second light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

Figure 1:
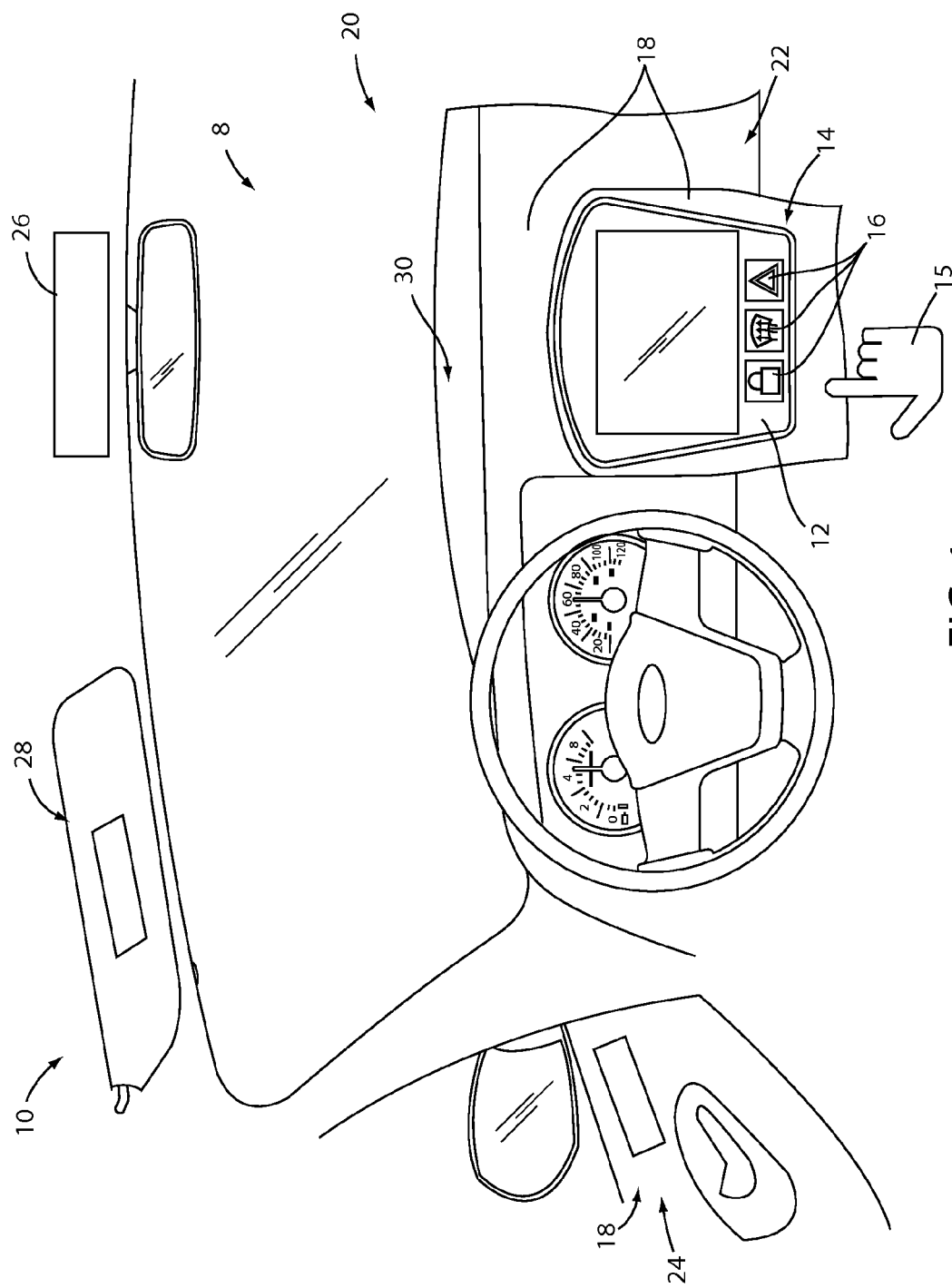
FIG. 1 is a diagram of a passenger compartment of a vehicle comprising a user interface in the form of at least one hidden sensor.

Referring to FIG. 1, a passenger cabin 8 of a vehicle 10 is shown comprising a user interface 12 in the form of at least one hidden sensor 14. The user interface 12 is configured to reveal the hidden sensor 14 in response to a detection of an object 15 at a first proximity to the hidden sensor 14. The user interface 12 may be configured to operate in at least two states. In a first state, the user interface 12 may be configured to provide ambient lighting to illuminate at least a portion of a vehicle panel 18 and/or trim portion. In a second state, the user interface 12 may be configured to selectively illuminate the hidden sensor 14 to reveal or display at least one symbol 16 and/or icon in response to the object 15 within the first proximity of the hidden sensor 14. When the symbol 16 is revealed, the location and function of the hidden sensor 14 is made visible to provide for a sensor that is selectively revealed in response to a detection of the object at first proximity.

The user interface 12 comprising the at least one hidden sensor 14 is in communication with a controller 20. The controller 20 is configured to control various lighting functions of the user interface 12 as well as receive signals corresponding to a user input to the hidden sensor 14. In response to a user input, the controller 20 is operable to output a control signal configured to control devices and/or systems of the vehicle 10. In this way, the controller 20 may control a variety of devices and/or systems of the vehicle 10 via the at least one hidden sensor 14. For example, devices and/or systems of the vehicle 10 may include door locks, windows, heat/cooling, defrost, hazard lighting, utility lighting, infotainment, radio, navigation functions, etc.

In the first state, the controller 20 is configured to control the light source to output the ambient lighting. The ambient lighting may be generated by a first photoluminescent portion that is selectively illuminated by a first light source configured to transmit a first emission of light through a first light guide. In response to the detection of the object 15 at the first proximity or predetermined distance, the controller 20 is configured to control the user interface 12 to change to the second state. In the second state, the controller 20 is configured to reveal the one or more symbols 16 by illuminating a second photoluminescent portion. The second photoluminescent portion may be selectively illuminated by a second light source configured to transmit a second emission of light through a second light guide. In the second state, the first light source may or may not further be deactivated.

As discussed herein, the one or more symbols 16 may comprise any form of identifier that may demonstrate at least a location of the hidden sensor 14. For example, the symbols may be a character, design, figure, shape, and/or pattern configured to identify a location and a function of the hidden sensor 14. The vehicle panel 18 and/or trim portion may include any interior or exterior portion of the vehicle 10. For example, the vehicle panel 18 may correspond to a panel trim portion of a center console 22, door panel 24, headliner 26, visor 28, dashboard 30, an interior or exterior door handle trim portion and/or any other vehicle panel. The user interface 12 may provide for controls corresponding to various devices and/or systems of the vehicle 10 to be distributed in various locations in the vehicle 10 while maintaining a simple and attractive appearance in the passenger cabin 8.

Figure 2A:
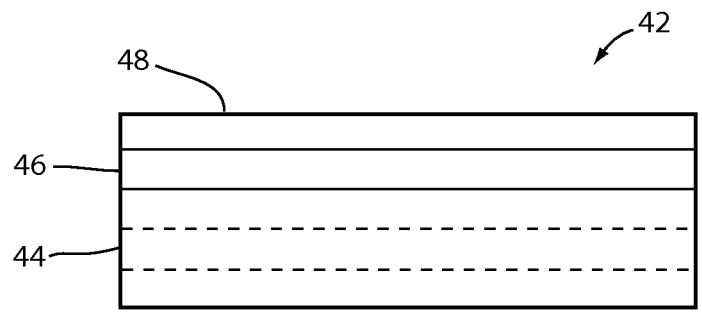
FIG. 2A illustrates a photoluminescent structure rendered as a coating according to one embodiment.
Figure 2B:
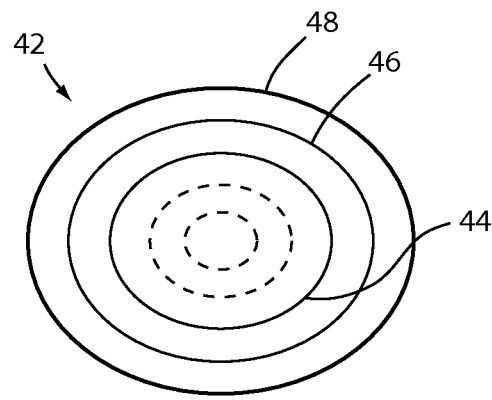
FIG. 2B illustrates the photoluminescent structure rendered as a discrete particle according to another embodiment.
Figure 2C:
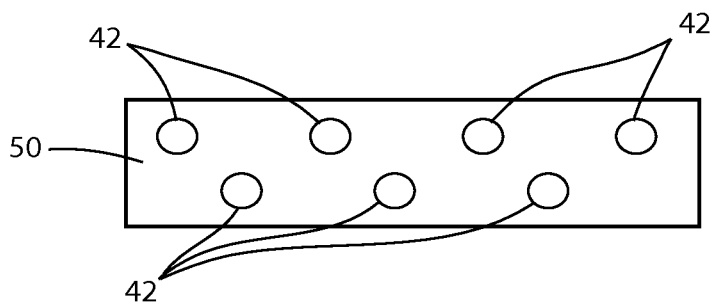
FIG. 2C illustrates a plurality of photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the photoluminescent portions as discussed herein, for example the first photoluminescent portion and the second photoluminescent portion. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent material may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as a Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) corresponds to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, bar coating, etc. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be co-extruded to prepare an integrated multi-layered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture and/or panel.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures that may be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
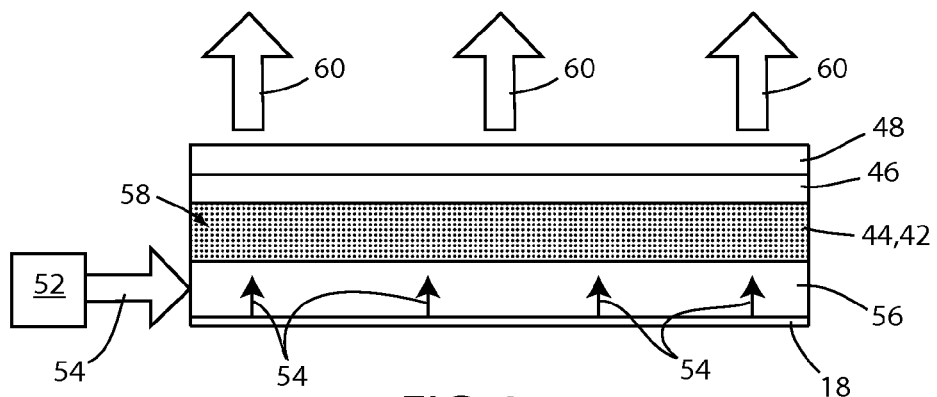
FIG. 3 illustrates a lighting system configured to convert a first emission of light to a second emission of light.

Referring to FIG. 3, a diagram of the user interface 12 is shown demonstrating a conversion process of at least one photoluminescent portion. For clarity, FIG. 3 is described in reference to the first light source 52 as discussed herein, though similar conversion processes may correspond to additional light sources discussed herein. The first light source 52 is configured to output the first emission 54. The first emission 54 is transmitted via the first light guide 56 along the energy conversion layer 44 to evenly distribute the first emission 54 along a first photoluminescent portion 58. The energy conversion layer 44 is configured to convert the first emission 54 to a second emission 60 at a converted different wavelength.

The first emission 54 comprises a first wavelength $\lambda_1$ of light, and the second emission 60 comprises a second wavelength $\lambda_2$ of light. The light guide 60 may include the photoluminescent structure 42 rendered as a coating and applied to a panel 18 of the vehicle 10 to form a photoluminescent portion (e.g. the first photoluminescent portion 58 or the second photoluminescent portion). In some implementations, the photoluminescent structure 42 may also be dispersed and incorporated within at least a portion of the light guide 56. The photoluminescent structure 42 includes the energy conversion layer 44, and in some implementations may include the stability layer 46 and/or the protective layer 48.

In response to the first light source 52 being activated, the first emission 54 is converted from the first wavelength $\lambda_1$ to the second emission 60 having the second wavelength $\lambda_2$. The second emission 60 and other emissions generated by photoluminescent structures, as discussed herein, may include one or more wavelengths having spectral characteristics defining a variety of colors and combinations thereof. The specific designations of the wavelengths (e.g. $\lambda_2$, $\lambda_4$) are provided for clarity and should not be considered to limit combinations of wavelengths corresponding to one or more spectral frequencies of light in the emissions as discussed herein.

In various implementations, the user interface 12 comprises at least one energy conversion layer 44 configured to convert the first emission 54 at the first wavelength $\lambda_1$ to the second emission 60 having at least the second wavelength $\lambda_2$. In order to generate the plurality of wavelengths, which may correspond to the second wavelength $\lambda_2$ and the fourth wavelength $\lambda_4$, the energy conversion layer 44 may comprise a red-emitting photoluminescent material, a green-emitting photoluminescent material, and a blue-emitting photoluminescent material. The energy conversion layer 44 may further comprise one or more photoluminescent materials configured to emit combinations of wavelengths corresponding to combinations of red, green, and blue light dispersed in the polymer matrix 50. For example, a red, green, and blue-emitting photoluminescent material may be utilized to generate the significantly white light for the second emission 60.

Each of the photoluminescent materials utilized to generate the various emissions may vary in output intensity, output wavelength, and peak absorption wavelengths based on a particular photochemical structure and combinations of photochemical structures utilized in the energy conversion layer 44. As an example, the output intensity of the second emission 60 may be changed by adjusting the wavelength of the first emission $\lambda_1$ to activate the photoluminescent materials of the first photoluminescent portion 58 at different intensities. In addition to, or alternatively to the red, green, and blue-emitting photoluminescent materials, other photoluminescent materials may be utilized alone and in various combinations to generate the second emission 60 and other emissions generated by photoluminescent portions as described herein in a wide variety of colors. In this way, the user interface 12 may be configured for a variety of applications to provide a desired lighting color and effect for the vehicle 10.

Each of the light sources (e.g. the first light source 52, the second light source 74) may also be referred to as excitation sources operable to emit at least one emission of light configured to excite a photoluminescent material utilized in the energy conversion layer of a photoluminescent portion. The light sources may comprise any form of light source, for example halogen lighting, fluorescent lighting, light emitting diodes (LEDs), organic LEDs (OLEDs), polymer LEDs (PLEDs), solid state lighting or any other form of lighting configured to output the emission utilized as excitation sources for the photoluminescent portions.

In an exemplary implementation, the first emission 54 from the first light source 52 may be configured such that the first wavelength $\lambda_1$ corresponds to at least one absorption wavelength of the one or more photoluminescent materials of the energy conversion layer 44 in the first photoluminescent portion 58. In response to receiving the light at the first wavelength $\lambda_1$, the energy conversion layer 44 may be excited and output the second emission 60 having the second wavelength $\lambda_2$. The first emission 54 provides an excitation source for the energy conversion layer 44 by targeting absorption wavelengths of the various photoluminescent materials utilized therein. As such, the user interface 12 is configured to output the second emission 60 to generate a desired light intensity and color.

Figure 4A:
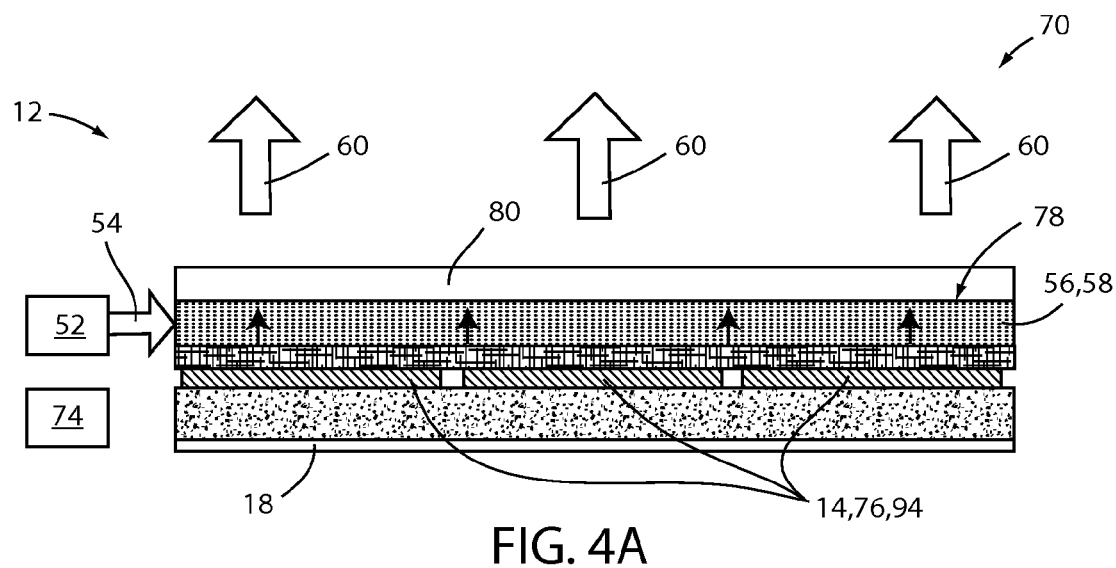
FIG. 4A is a cross-sectional view of a user interface configured in a first state to output ambient lighting.
Figure 4B:
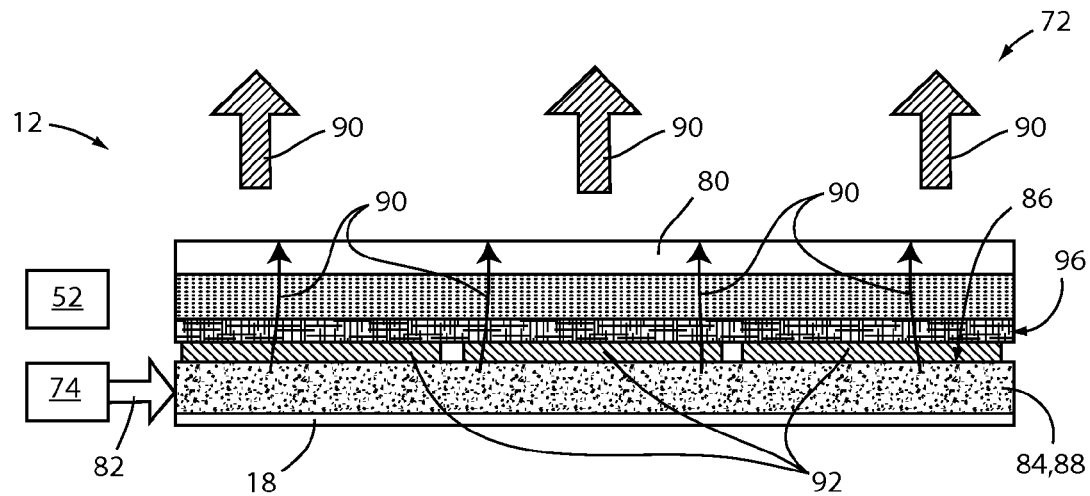
FIG. 4B is a cross-sectional view of a user interface configured in a second state to reveal symbols corresponding to at least one hidden sensor.

Referring to FIGS. 4A and 4B, cross-sectional views of the user interface 12 are shown. FIG. 4A corresponds to the user interface 12 configured in the first state 70 such that the controller 20 is configured to supply a signal to the first light source 52 to generate ambient lighting. FIG. 4B corresponds to the user interface 12 configured in the second state 72 such that the controller 20 is configured to supply a signal to the second light source 74 to reveal the symbols 16. The controller 20 is operable to control the state of the user interface 12 upon receiving a detection signal corresponding to the object 15 being within a first proximity of the at least one hidden sensor 14. As demonstrated in FIGS. 4A and 4B, the at least one hidden sensor 14 corresponds to a plurality of sensors 76 as demonstrated in FIGS. 5A-5B. For clarity, some reference numerals are omitted in the figures referred to herein.

In the first state 70, the first light source 52 is activated by the controller 20 to emit the first emission 54 into the first light guide 56. The first light guide 56 may incorporate the energy conversion layer 44 dispersed proximate an exterior surface 78 of the first light guide 56 to form the first photoluminescent portion 58. In some implementations, the energy conversion layer 44 may also be incorporated as a separate layer on the exterior surface 78. In response to receiving the first emission 54, the first photoluminescent portion 58 is configured to convert the first wavelength $\lambda_1$ of the first emission 54 to the second wavelength $\lambda_2$ of the second emission 60. The second emission 60 may be output from the user interface 12 through an exterior surface 80 to generate the ambient lighting from the panel 18 of the vehicle 10.

In the second state 72, the first light source 52 may be deactivated. Additionally, the second light source 74 may be activated by the controller 20 to emit a third emission 82 having a third wavelength $\lambda_3$. The third emission 82 is emitted into the second light guide 84. The second light guide 84 may be formed similar to the first light guide 56 by incorporating the energy conversion layer 44 dispersed proximate an exterior surface 86 of the second light guide 84 to form the second photoluminescent portion 88. The third emission 82 is dispersed by the second light guide 84 such that the third emission 82 impinges substantially upon the extents of the second photoluminescent portion 88.

In response to receiving the third emission 82, the second photoluminescent portion 88 is configured to convert the third wavelength $\lambda_3$ of the third emission 82 to a fourth emission 90 having a fourth wavelength $\lambda_4$. The fourth emission 90 is transmitted through the plurality of sensors 76 and a plurality of symbols 92 corresponding to the at least one symbol 16. The plurality of sensors 76 may correspond to the transparent sensors 94 and the plurality of symbols 92 may be formed of an opaque material configured to limit the transmission of the fourth emission 90 therethrough. As such, the fourth emission 90 transmitted from the second photoluminescent portion 88 passes through the transparent sensors 94, the first photoluminescent portion 58, and the exterior surface 80 generating a backlit projection of the plurality of symbols 92.

The backlit projection of the plurality of symbols 92 may correspond to an outline projected through the exterior surface 80 to reveal the location of at least one of the transparent sensors 94. In some implementations, the plurality of symbols 92 may also form a mask such that the shapes form an outline of the symbols 92 and are transmitted through a mask layer 96. In some configurations, the symbol itself may form the proximity sensor 14. In this configuration, the fourth emission 90 is emitted through the exterior surface 80 to illuminate each of the shapes formed by the symbols 92 on the exterior surface 80. Various techniques may be utilized to project the shapes of the symbols 92 through the exterior surface 80 without departing from the spirit of the disclosure.

In some implementations, the first photoluminescent portion 58 is configured to convert substantially all of the first emission 54 having the first wavelength $\lambda_1$ to the second emission 60 having the second wavelength $\lambda_2$. Similarly, the second photoluminescent portion 88 may be configured to convert substantially all of the third emission 82 having a third wavelength $\lambda_3$ to the fourth emission 90 having a fourth wavelength $\lambda_4$. In this configuration, as the fourth emission 90 is transmitted through the first photoluminescent portion 58 and output from the exterior surface 80, the fourth wavelength $\lambda_4$ is outside a first absorption range of the first photoluminescent portion 58. As such, the spectral characteristics of the fourth wavelength $\lambda_4$ may be maintained because the fourth emission 90 is configured to pass through the first photoluminescent portion 58 without exciting the energy conversion layer 44. In this configuration, the second emission 60 and the fourth emission 90 may be activated simultaneously or independently to provide the ambient lighting and reveal the one or more symbols 16.

In some implementations, the first emission 54 from the first light source 52 may be configured such that the first wavelength $\lambda_1$ corresponds to a first absorption range of the first photoluminescent portion 58. The third emission 82 from the second light source 76 may further be configured such that the third wavelength $\lambda_3$ corresponds to a second absorption range of the second photoluminescent portion 88. The first absorption range may correspond to a light absorption range that is substantially different than the second absorption range. In this configuration, the first light source 52 may selectively activate the first photoluminescent portion 58 with the first emission 54 in the first absorption range and the second light source 74 may selectively activate the second photoluminescent portion 88 with the third emission 82 in the second absorption range. In this configuration, the energy conversion ranges (e.g. the first absorption range and the second absorption range) form substantially different ranges of wavelength that may be converted by the photoluminescent portions 58 and 88. This configuration may also provide for simultaneous or independent activation of the second emission 60 and the fourth emission 90.

The term absorption range, as used herein, defines a range of wavelengths that excite a photoluminescent portion or structure and cause a photoluminescent material to become excited. In response to the excitation, the photoluminescent portion emits an emission having at least one wavelength of light which may be at least partially outside the absorption range. The absorption ranges of the photoluminescent materials as discussed herein may vary based on desired activation wavelengths and output wavelengths to excite the photoluminescent portions to generate various lighting colors and combinations. Additionally, the emission of light from a photoluminescent portion may be selected based on the material properties of the photoluminescent structures discussed herein.

The first absorption range may correspond to a range of wavelengths in blue and/or near UV range of light having wavelengths of approximately 390-450 nm. The second absorption range 94 may correspond to a substantially non-overlapping range of wavelengths in the UV and/or blue range of light having wavelengths of approximately 250-410 nm. The first emission 16 may be approximately 470 nm configured to cause the first photoluminescent portion 24 to output the second emission 20 of approximately 525 nm. The third emission 82 may be approximately 350 nm configured to cause the second photoluminescent portion 30 to output the fourth emission 32 of approximately 645 nm. In this way, the second emission 20 and the fourth emission 32 may be selectively excited by the light sources. In an exemplary implementation, the second and fourth emissions may correspond to a substantially green colored light and a substantially orange-red colored light, respectively.

In some implementations, the first photoluminescent portion 30 may comprise an organic fluorescent dye configured to convert the first emission 16 to the second emission 20. For example, the first photoluminescent material may comprise a photoluminescent structure of rylenes, xanthenes, porphyrins, phthalocyanines, or other materials suited to a particular Stoke shift defined by an absorption range and emission fluorescence. The first photoluminescent portion 30 and corresponding material may be configured to have a shorter Stoke shift less than the second photoluminescent portion in terms of wavelength. In this way, each of the photoluminescent portions 24 and 30 may be independently illuminated by the light sources 22 and 26 to output different colors of light.

The second photoluminescent portion 30 may comprise a photoluminescent structure 42 configured to generate a longer stoke shift than the first photoluminescent portion 30. The second photoluminescent portion may comprise an organic or inorganic material configured to have the second absorption range and a desired output wavelength or color. In an exemplary embodiment, the photoluminescent structure 42 of the second photoluminescent portion 30 may be of at least one inorganic luminescent material selected from the group of phosphors. The inorganic luminescent material may more particularly be from the group of Ce-doped garnets, such as YAG:Ce. This configuration may provide for a second stoke shift of the second photoluminescent portion 58 to be longer than a first stoke shift of the first photoluminescent portion 30.

To achieve the various colors and combinations of photoluminescent materials described herein, the user interface 12 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 10, 2013, all of which are incorporated herein by reference in their entirety.

Figure 5A:
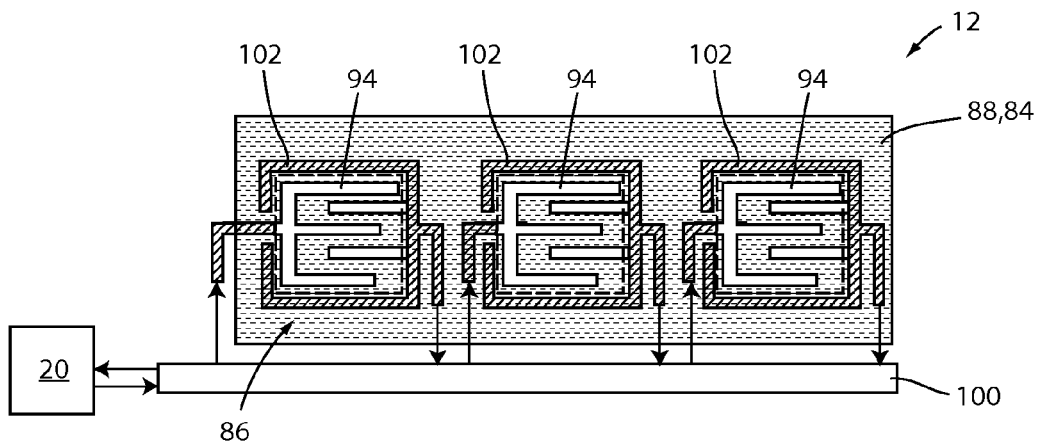
FIG. 5A is a top assembly view of a user interface demonstrating a plurality of transparent sensors.
Figure 5B:
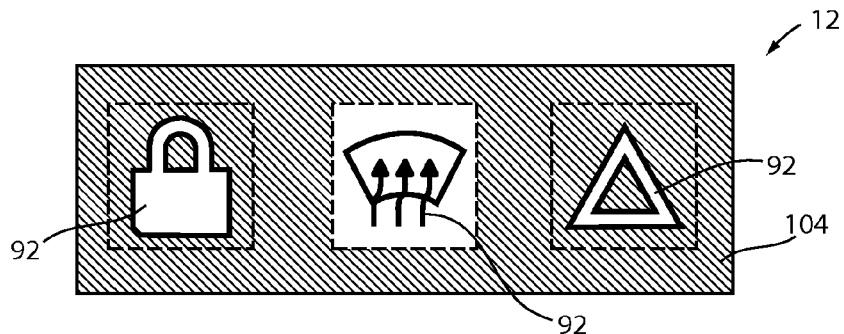
FIG. 5B is a top assembly view of a user interface demonstrating a plurality of transparent sensors and a plurality of symbols configured to identify a location of the plurality of sensors.

Referring to FIGS. 5A to 5B, top assembly views of the user interface 12 demonstrate the configuration of the photoluminescent portions 58 and 88, the transparent sensors 94, and the plurality of symbols 92. Referring to FIG. 5A, the second photoluminescent portion 88 is shown having the plurality of transparent sensors 94 disposed on the exterior surface 86 of the second photoluminescent portion 88. As discussed herein, the second photoluminescent portion 88 may comprise a layer of and/or be dispersed in at least a portion of the second light guide 84. The second light guide comprises the energy conversion layer 44 configured to emit white light as the fourth emission 90 in response to receiving the third emission 82.

The transparent sensors 94 may comprise capacitive pads printed in conductive ink and disposed on the exterior surface 86. Each of the sensors 94 is in communication with an input/output (I/O) interface 100 of the controller 20 via printed silver conductive ink 102 having a low resistance. Further details of the controller 20 and the I/O interface 100 are discussed in reference to FIG. 8. In operation, the sensors 94 are operable to detect the object 15 at a first proximity and send a signal to the controller 20 identifying the presence of the object 15 at the first proximity. In response to receiving the signal from at least one of the sensors 94, the controller 20 is configured to deactivate the first light source 52 and activate the second light source 74 to illuminate the second photoluminescent portion 88.

Referring to FIG. 5B, a mask 104 is shown including the plurality of symbols 92. The mask 104 may be formed of an opaque material, for example a black ink disposed over the transparent sensors 94. In this configuration, when the object 15 is detected at the first proximity, the fourth emission 90 activated by the controller 20 via the second light source 74. The fourth emission 90 may pass through the mask 104, the first light guide 56, and the first photoluminescent portion 58 causing each of the symbols 92 to become visible through the exterior surface 80. When the second photoluminescent portion 88 is activated to emit the fourth emission 90, the user interface is configured in the second state 72.

Figure 6A:
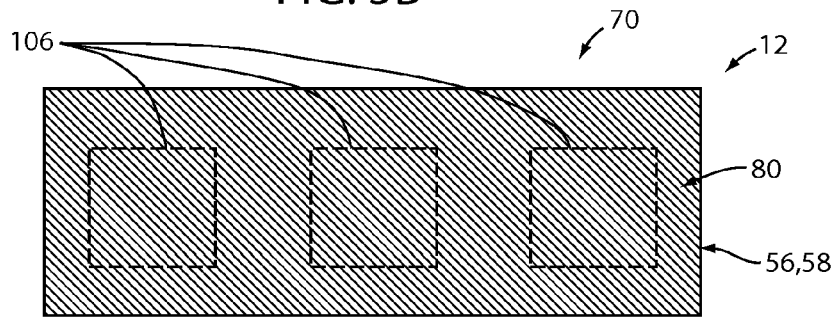
FIG. 6A is a top view of a user interface configured in a first state to output ambient lighting.
Figure 6B:
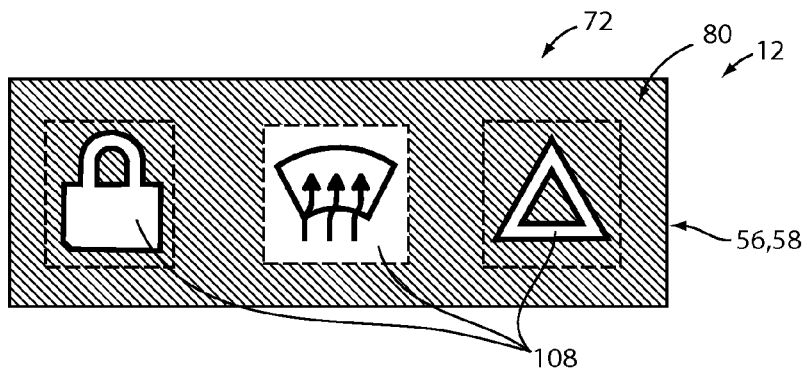
FIG. 6B is a top view of a user interface configured in a second state to reveal symbols corresponding to at least one hidden sensor.

The user interface 12 is demonstrated in the first state 70 in FIG. 6A and in the second state 72 in FIG. 6B. Referring to FIGS. 4A-4B and 6A-6B, an exemplary description of the operation of the user interface 12 is discussed. In the first state 70, as demonstrated in FIGS. 4A and 6A, the first light source 52 is controlled by the controller 20 to emit the first emission 54. In response to receiving the first emission 54 the first photoluminescent portion 58 is illuminated to generate the second emission 60. The second emission 60 is output through the exterior surface 80 such that the vehicle panel 18 is illuminated by ambient light at the second wavelength $\lambda_2$. The controller 20 may be configured to control the user interface 12 to operate in the first state 70 in response to determining that the signal from the sensors 94 does not correspond to the object 15 being within the first proximity. In FIG. 6A a plurality of outlines 106 are shown as a reference to demonstrate the location of each of the sensors 94. In actual embodiments of the user interface 12, the outlines 106 may not be visible in the first state 70.

In response to receiving the signal from the sensors 94 corresponding to the object 15 being detected within the first proximity, the controller 20 is configured to control the user interface 12 to change from the first state 70 to the second state 72. In the second state 72, as demonstrated in FIGS. 4B and 6B, the controller 20 may be configured to deactivate the first light source 52 and activate the second light source 74 to emit the third emission 82. In response to receiving the third emission 82, the second photoluminescent portion 88 may become excited and emit the fourth emission 90 at the fourth wavelength $\lambda_4$. The fourth emission 90 may pass through the transparent sensors 94, the symbols 92 corresponding to transparent portions 108 of the mask 104, and the first photoluminescent portion 58. The fourth emission 90 is then output through the exterior surface 80 such that the transparent portions 108 of the mask 104, forming the symbols 92, are illuminated to demonstrate both the location of and the function controlled by the sensors 94.

Each of the symbols 92 and their respective functions may be described by characters and/or shapes that may be illuminated by the fourth emission 90 in the second state 72. The functions of the sensors 94 demonstrated on the symbols 92 may be configured to control a variety of accessories and systems in the vehicle 10. The symbols 92 illustrated herein may correspond to a door locking operation, a defrost operation, and a hazard light operation. Though these specific examples are demonstrated, the sensors 94 may be configured to control a variety of vehicle systems, for example heat, air conditioning, windshield wipers, interior lighting, various inputs and controls for an audio system and any other system of the vehicle 10.

Figure 7A:
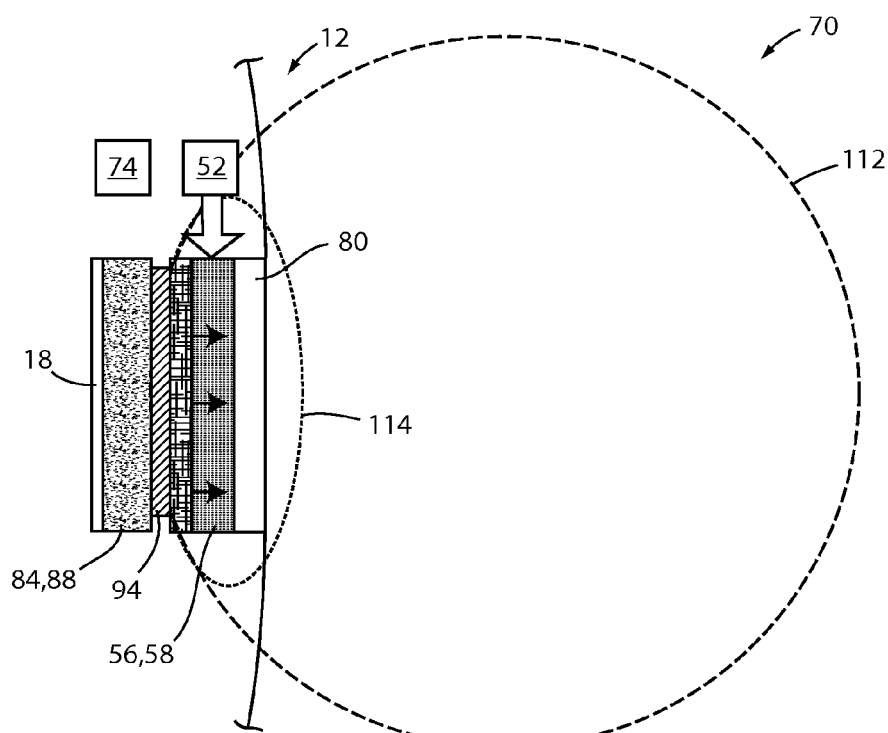
FIG. 7A is a cross-sectional view of a user interface in a first state demonstrating a first proximity and a second proximity.
Figure 7B:
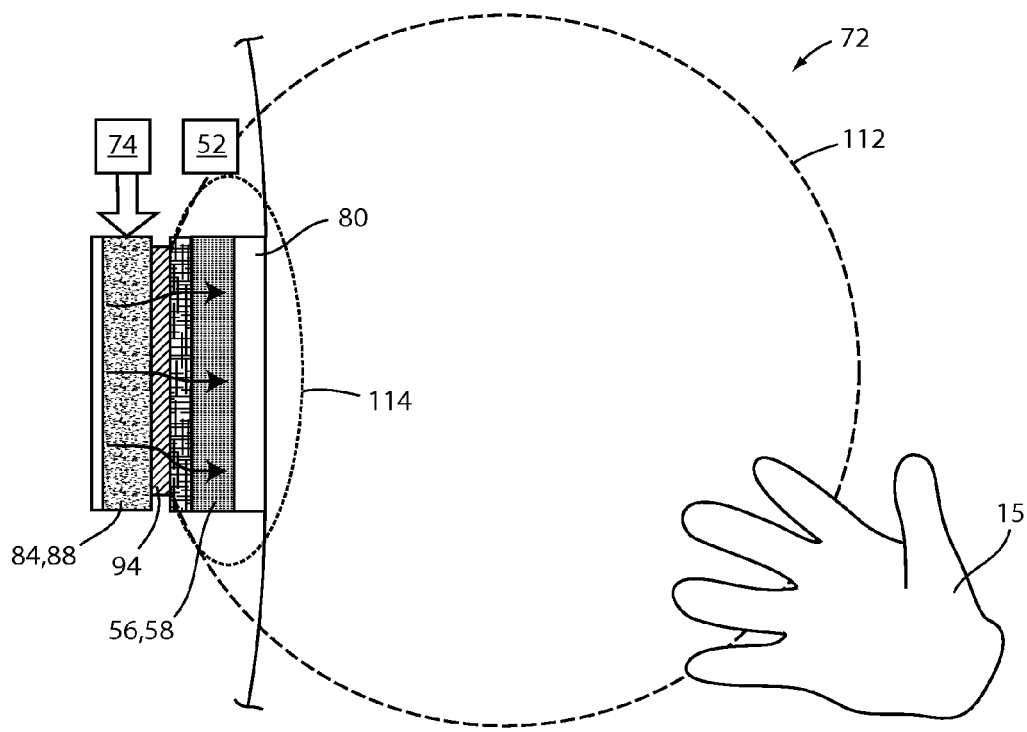
FIG. 7B is a cross-sectional view of a user interface in a second state demonstrating a first proximity and a second proximity.

Referring now to FIGS. 7A and 7B, the user interface 12 is respectively shown in the first state 70 and a second state 72. The first state 70 may be controlled by the controller 20 in response to the object 15 being undetected at the first proximity 112. In response to receiving a signal from at least one of the transparent sensors 94 corresponding to a detection of the object 15 within the first proximity 112, the controller 20 is configured to control the user interface 12 to change from the first state 70 to the second state 72. In the second state 72 each of the symbols 92 may become visible such that a location and function of each of the sensors 94 is identified. As discussed herein, the first and second photoluminescent portions 58, 88 may be activated alone or in combination in the second state 72.

In order to control the functions of each of the sensors 94, the controller 20 is further configured to identify a signal from each of the sensors 94 corresponding to a detection of the object 15 at a second proximity 114. The signal at the first proximity 112 may differ from the signal of the second proximity 114 in that the second proximity 114 may correspond to a higher signal level than the signal at the first proximity 112. The controller 20 may be operable to determine the difference between a signal corresponding to the object 15 at the first threshold 112 and a signal corresponding to the object 15 at the second threshold 114 by comparing the signals from each of the sensors 94 to a first predetermined value and a second predetermined value, respectively. For additional information regarding proximity sensors, refer to U.S. Patent Publication No. US2012/0313648 A1 to Salter, et al., entitled "PROXIMITY SWITCH HAVING SENSITIVITY CONTROL AND METHOD THEREFOR," filed Jun. 9, 2011 which is incorporated herein by reference in its entirety.

Upon receiving a signal from at least one of the sensors 94 exceeding the first predetermined value, the controller 20 is configured to control the user interface 12 to change from the first state 70 to the second state 72. As the signal from the sensor 94 changes due to the object 15 approaching the sensor 94, the controller 20 may detect that the signal exceeds the second predetermined value. In response to receiving the signal corresponding to a sensor signal exceeding the second predetermined value, the controller 20 is configured to output a control output to control the function of the selected sensor. In this way, the controller 20 is configured to reveal the location and function of each of the sensors 94 and further control at least one control output of a plurality of devices controlled by each of the sensors 94.

Figure 8:
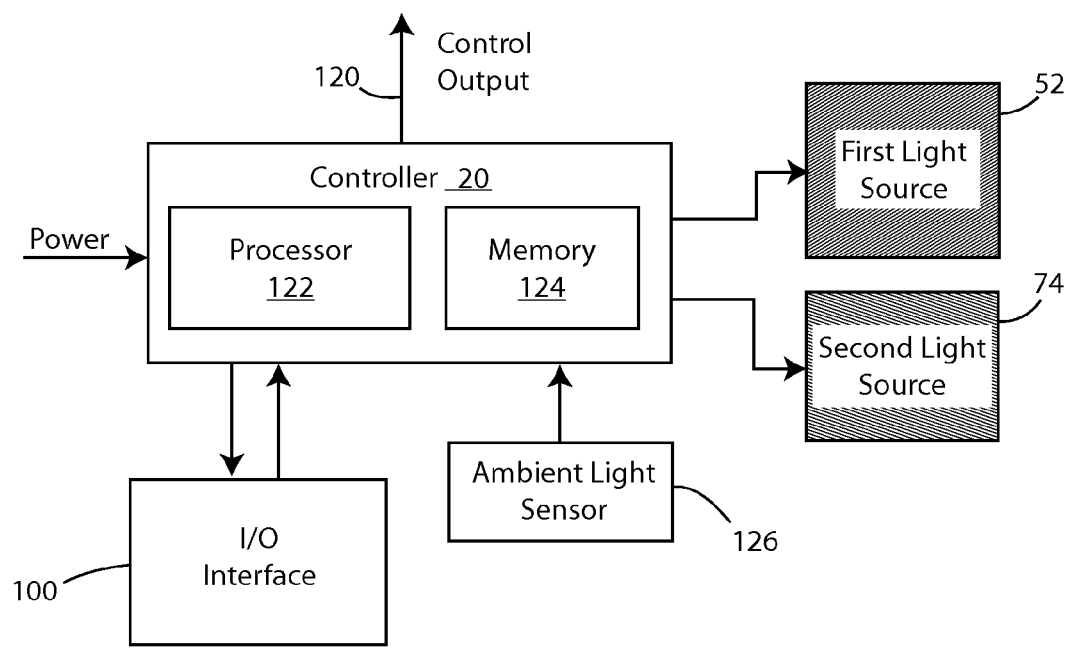
FIG. 8 is a block diagram of the controller operable to control a user interface in a first state to a second state and output a control output in response to a proximity detection.

Referring now to FIG. 8, a block diagram of the controller 20 in communication with the first light source 52 and the second light source 74 is shown. The controller 20 is in communication with the I/O interface 100 and configured to communicate with and control the user interface 12 to change from the first state 70 wherein the first light source 52 is activated to the second state 72 wherein the second light source 74 is activated. In some implementations, the first and second light sources 52, 74 may be activated in the second state 72. In this configuration, the controller 20 is operable to identify a signal corresponding to the object 15 at the first proximity 112 to activate the second state 72. Further, the controller 20 is operable to identify a signal corresponding to the object 15 at the second proximity 114 (e.g. a user input) to control at least one function of a system and/or accessory of the vehicle 10 that may be output via at least one control output 120.

The controller 20 may comprise one or more circuits configured to receive the signals from the I/O interface 100. The controller 20 may comprise at least one processor 122 and memory 124 operable to receive the at least one signal from one of the sensors 94 to control the state of the user interface 12 (e.g. states 70 and 72) and communicate at least one user input configured to control a system and/or accessory of the vehicle 10 via the control output 120. The controller 20 is further in communication with an ambient light sensor 126. The ambient light sensor 126 may be operable to communicate a light condition proximate the user interface 12, for example a level brightness or intensity of the ambient light proximate the vehicle 10. In response to the level of the ambient light, the controller 20 may be configured to adjust an output intensity of the emissions from each of the light sources 52 and 74. The intensity of the light output from the light source may be adjusted by controlling a duty cycle, current, or voltage supplied to the light source to optimize the visibility of the user interface, including the ambient lighting and the symbols, based on the ambient lighting conditions.

The various implementations of the disclosure provide for a selectively hidden user interface that provides attractive ambient lighting as well as at least one input operable to control a variety of vehicle systems and accessories. For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A user interface for a vehicle comprising:
a first light guide disposed proximate an exterior surface;
a second light guide disposed proximate the first light guide;
a proximity sensor disposed proximate the first light guide and the second light guide; and
at least one symbol disposed between the first light guide and the second light guide, wherein, a symbol is selectively illuminated in a backlit configuration.

2. The user interface according to claim 1, wherein the symbol is selectively illuminated by the second light guide in response to the proximity sensor detecting an object within a first threshold.

3. The user interface according to claim 1, wherein the exterior surface comprises a touch surface of the user interface.

4. The user interface according to claim 1, wherein the first light guide and the second light guide are configured to illuminate a first photoluminescent portion and a second photoluminescent portion.

5. The user interface according to claim 4, wherein the first light source is configured to emit a first emission at a first wavelength to illuminate the first photoluminescent portion in a second emission.

6. The user interface according to claim 5, wherein the first light source is selectively activated in response to the proximity sensor communicating an absence of an object in a first threshold.

7. The user interface according to claim 6, wherein the second light source is configured to emit a third emission at a second wavelength to illuminate the second photoluminescent portion in a fourth emission.

8. The user interface according to claim 7, wherein the fourth emission corresponds to a different color than the second emission.

9. A selectively visible user interface comprising:
a controller in communication with at least one light source and a proximity sensor; and
a vehicle panel configured to conceal the proximity sensor, wherein the controller is configured to:
identify a first signal from the proximity sensor corresponding to a detection of an object at a first proximity; and
activate the light source in response to the detection to reveal a symbol demonstrating a function of a user input to the proximity sensor.

10. The user interface according to claim 9, further comprising:
a photoluminescent portion disposed on the vehicle panel, the photoluminescent portion being configured to selectively emit a second emission in response to receiving a first emission from the light source.

11. The user interface according to claim 10, wherein the second emission comprises an ambient lighting configured to illuminate the vehicle panel in ambient light having a first color.

12. The user interface according to claim 10, wherein the at least one light source comprises a first light source and a second light source, the first light source configured to emit the first emission and the second light source configured to emit a third emission.

13. The user interface according to claim 12, wherein the photoluminescent portion comprises a first photoluminescent portion configured to emit the second emission and a second photoluminescent portion configured to emit a fourth emission in response to receiving the third emission.

14. The user interface according to claim 13, wherein the second photoluminescent portion is configured to illuminate the symbol in the backlit configuration in response to the detection.

15. The user interface according to claim 13, wherein the controller is configured to selectively illuminate the second photoluminescent portion to emit the fourth emission and deactivate the first photoluminescent portion from emitting the second emission in response to the detection.

16. A user interface for a vehicle comprising:
a vehicle panel comprising a proximity sensor, a first photoluminescent portion and a second photoluminescent portion,
a first light source configured to selectively activate the first photoluminescent portion; and
a second light source configured to selectively activate the second photoluminescent portion, wherein the second photoluminescent portion is configured to reveal a symbol in a backlit configuration in response to the activation of the second light source.

17. The user interface according to claim 16, wherein the second light source is selectively activated in response to a detection of an object in a first proximity by the proximity sensor.

18. The user interface according to claim 16, wherein the proximity sensor comprises a capacitive sensor printed in transparent conductive ink.

19. The user interface according to claim 17, wherein the first light source is configured to emit a first emission having a first wavelength to activate the first photoluminescent portion to output a second emission corresponding to a first color of light.

20. The user interface according to claim 18, wherein the second light source is configured to emit a third emission having a third wavelength to activate the second photoluminescent portion to emit a fourth emission corresponding to a second color of light.

* * * * *